Sept. 26, 1933.   T. THORSEN   1,928,514
CUTTER HEAD FOR BORING MACHINES
Filed Jan. 20, 1932   2 Sheets-Sheet 1
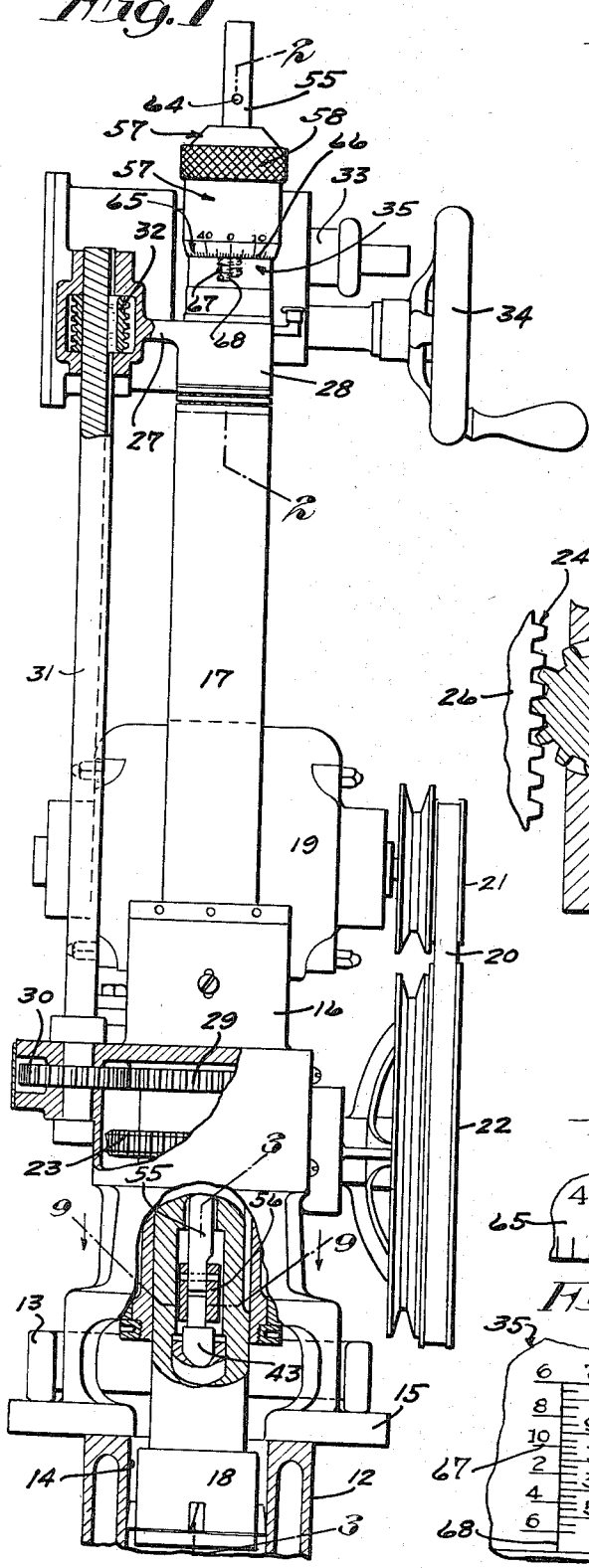

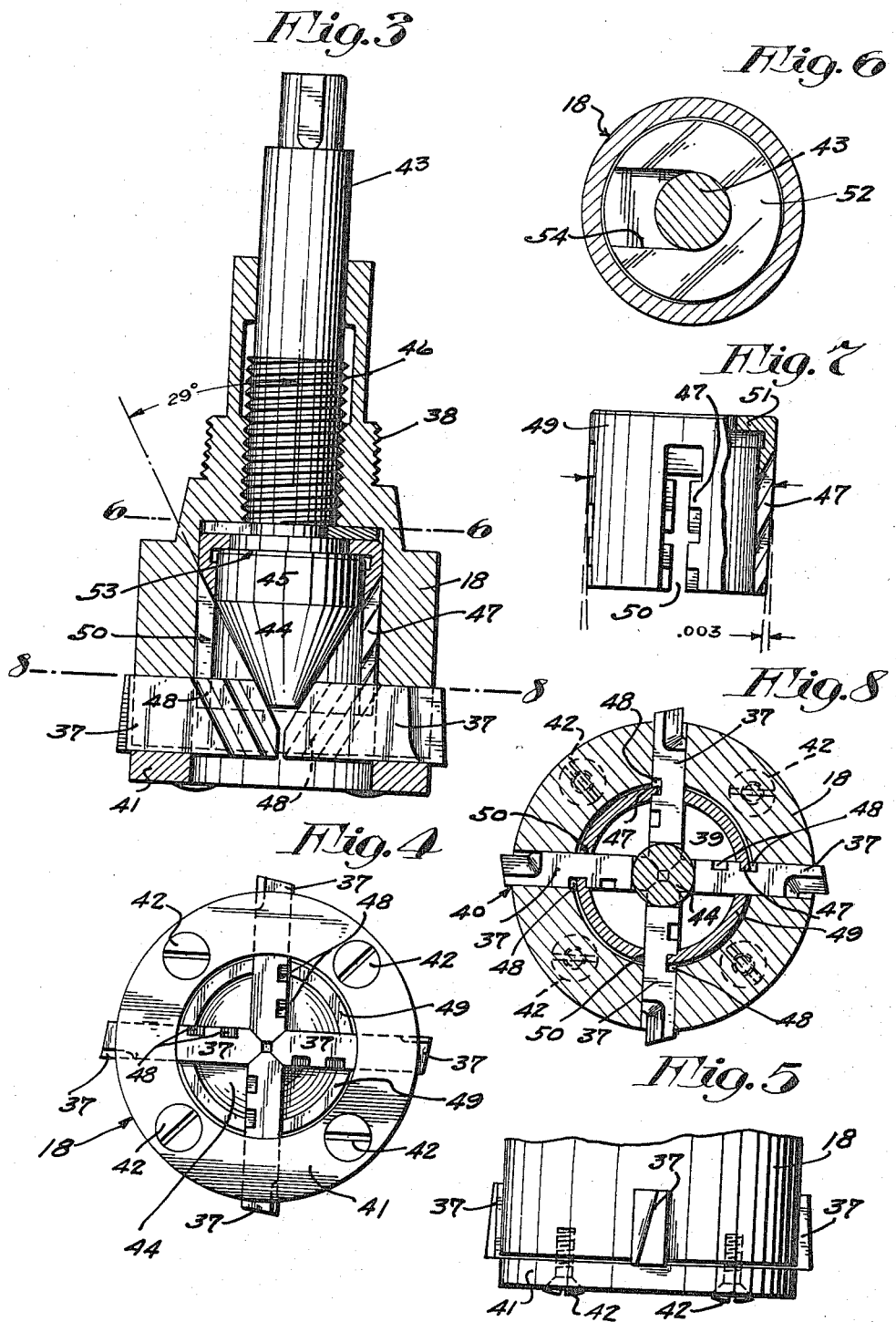

Patented Sept. 26, 1933

1,928,514

UNITED STATES PATENT OFFICE 1,928,514

CUTTER HEAD FOR BORING MACHINES

Thor Thorsen, Minneapolis, Minn., assignor to Storm Manufacturing Co., Inc., Minneapolis, Minn., a corporation of Minnesota Application January 20, 1932. Serial No. 587,707

5 Claims. (Cl. 77—76)

This invention relates to boring machines of the type disclosed and broadly claimed in my application for United States Letters Patent executed of even date herewith. The object of the invention is to provide a highly efficient cutter head for such a machine that has novel means for adjusting its cutter blades, including a micrometer for setting said blades for a cut of a predetermined diameter and indicating at all times the diameter at which the cutter blades are set to cut, and novel means for retracting the cutter blades.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of a boring machine having the invention embodied therein;

Figs. 2 and 3 are views partly in side elevation and partly in section taken on the lines 2—2 and 3—3 of Fig. 1, respectively, on an enlarged scale;

Fig. 4 is a bottom plan view of the cutter head removed from the machine;

Fig. 5 is a fragmentary elevation of the cutter head, as shown in Fig. 4;

Fig. 6 is a detail view partly in elevation and partly in section taken on the line 6—6 of Fig. 3;

Fig. 7 is a view of the cutter blade retracting sleeve partly in elevation and partly in central section;

Fig. 8 is a view partly in plan and partly in section taken on the line 8—8 of Fig. 3;

Fig. 9 is a detail view in section taken on the line 9—9 of Fig. 1, on an enlarged scale;

Fig. 10 is a fragmentary detail view of the micrometer thimble and vernier; and

Fig. 11 is a fragmentary detail view of the upper portion of the boring bar and micrometer scale.

The boring machine illustrated and in which this invention is embodied is fully shown and described in the application heretofore referred to and, as shown, is mounted on the top of an engine cylinder block 12 and rigidly secured thereto by a clamp 13 with its boring bar centered with respect to one of the cylinders 14.

Of the parts of the boring machine illustrated it is important to note the base 15, the housing 16 and the boring bar 17 in the lower end of which is removably mounted the novel cutter head 18. The boring bar 17 is rotated about its longitudinal axis from an electric motor 19 mounted on the back of the boring machine and the driving connections therefrom include a belt 20 arranged to run over a pair of differential pulleys 21 and 22, the former of which is on the armature shaft of said motor and the latter of which is on a shaft journaled in the housing 16 and having a worm, not shown, which meshes with a worm gear 23 keyed to the boring bar 17 with its hub held against axial movement and through which hub the boring bar is free to move axially.

Axial or feeding movement is imparted to the boring bar 17 during its rotary movement by a rack 24 and a cooperating pinion 25. This rack 24 is formed with an upright guide post 26 the lower end of which, not shown, is anchored to the housing 16 and the pinion 25 is journaled in a cross-head 27 slidably mounted on the guide post 26 and having a hub 28 in which a reduced portion of the boring bar 17 is journaled. The pinion 25 is driven from the hub of the gear 23 by the following connections, to wit: Fixed on the hub of the gear 23 is a gear 29 which meshes with a gear 30 secured to the lower end portion of an upright shaft 31 having on its upper end portion a worm 32 which is gear-connected to the pinion 25 by variable speed transmission mechanism, not shown, and having a shiftable key provided with a hand-piece 33 by which said key may be moved from neutral into operative positions for varying the speed at which the boring bar 17 is moved axially. Said shaft 31 at its lower end portion is journaled in a bearing in the housing 16 and held against axial movement and the worm 32 is keyed to the shaft 31 for rotation therewith but with freedom for the shaft to be moved axially therethrough.

A hand-wheel 34 is provided for manually turning the pinion 25, when the hand-piece 33 is positioned with the key of the variable speed transmission mechanism in neutral position, to move the boring bar 17 axially. To permit the mounting of the cross-head hub 28 on the boring bar 17 said boring bar is provided with a removable section or upper end portion 35 which is detachably secured thereto by screw-threads and rigidly held from turning thereon by a set-screw 36.

The parts thus far described are fully shown and described in detail in the application heretofore referred to.

Referring now in detail to the cutter head 18 and the novel means for setting and retracting its cutter blades 37 which, as shown, are four in number. This cutter head 18 is detachably secured to the boring bar 17 by screw-threads 38, has in its bottom an annular recess 39 and notch-like seats 40 spaced equal distances apart and in which seats the cutter blades 37 are mounted for radial sliding movement with their inner end portions extending into said recess. The cutter blades 37 are held in the seats 40 by a friction ring 41 detachably secured to the cutter head 18 by a plurality of screws 42. This friction ring 41 bears directly on the under edges of the cutter blades 37 with slight clearance between said ring and cutter head to produce a drag on the cutter blades 37 which may be varied, at will, by adjusting said screws 42 to positively hold said blades where set.

The cutter blades 37 are positively projected by a pilot 43 which extends axially through the cutter head 18 and has on its lower end an inverted truncated conical member 44 axially aligned therewith and having a relatively wide cylindrical base 45. The inner ends of the cutter blades 37 are beveled to the same angle as the face of the conical member 44 and are directly engaged by said member during their projecting movement thereby.

The pilot 43 is connected to the cutter head 18 by screw-threads 46 which, when the pilot is turned about its axis in one direction, projects the conical member 44 between the cutter blades 37 and moves the same radially outward and when said pilot is turned in a reverse direction retracts said conical member to permit the cutter blades 37 to be retracted.

Cam connections are provided for retracting the cutter blades 37 by the movement of the pilot 43 to retract the conical member 44. Each of these cam connections includes a pair of cam studs or lugs 47 and a pair of cam grooves 48 in which said studs work. These cam studs 47 are formed with a sleeve-like carrier 49 interposed between the cutter head 18 and the base 45, has a working fit with each thereof and its lower edge and the lower end of the conical member 44 are in the same plane.

Formed in the lower portion of the carrier 49 are deep notches 50 through which the cutter blades 37 project and permit the required axial movement of the carrier 49 with the conical member 44 and interlocks said carrier with the cutter blades 37 to hold the same from turning with said member. Said carrier 49 is connected to the pilot 43, for axial movement therewith but with freedom to permit rotary movement of the base 45 therein, by an annular flange 51 and a cooperating horseshoe washer 52. The flange 51 is formed with the upper end of the carrier 49, extends laterally onto said carrier and rests on an annular shoulder 53 formed in the pilot 43 at the base 45 and the washer 52 is mounted in a circumferentially extended lock-groove 54 in the pilot 43, overlies the flange 51 and holds the same on the shoulder 53. Obviously the cutter head 18 holds the washer 52 against removal from the lock-groove 54 and the carrier 49, between the cutter head 18 and the base 45, acts as a bushing for the conical member 44.

The cam studs 47 extend into the notches 50 and are laterally spaced parallel to the axis of the pilot 43 and the cam grooves 48 are formed in one of the sides of the cutter blades 37, are laterally spaced radially in respect to said axis, and extend parallel to the face of the conical member 44, and hence, the cam surfaces on the inner ends of the cutter blades 37. The purpose of providing two cam studs 47 and two cam grooves 48 for each connection is to have one of the cam studs 47 well into its cam groove 48 before the other cam stud 47 moves out of its cam groove 48 during extreme movements of the carrier 49.

By reference to Fig. 7 it is important to note that the exterior of the carrier 49, below the base 45, is slightly tapered, as indicated, three one-thousandths of an inch, to provide sufficient clearance between the carrier 49 and cutter head 18 to permit slight springing action of said carrier due to pressure thereon by the cam connections 47—48 during projecting movement of the cutter blades 37 and thereby prevent binding between the carrier 49 and the cutter head 18.

In actual construction of the improved cutter head the transverse width of the cam grooves 48 will be such as to permit slight movement of the cutter blades 37 in respect to the cam studs 47 during their projecting movement so that the conical member 44 will have direct and positive contact with the cutter blades 37. Or, in other words, the cam connections 47—48 will not hold the cutter blades 37 out of contact with the conical member 44 so that they are projected by said connections instead of the conical member 44 and thereby prevent accurate setting of the cutter blades 37.

The pilot 43 is rotated, from a point above the boring bar 17, by an operating rod 55 which extends axially through the boring bar 17 and is detachably connected to said pilot by a sleeve-coupling 56. Said pilot 43 and the coupling 56 have flat contacting surfaces, as shown in Fig. 9, to hold the same for common rotation.

The operating rod 55 above the boring bar 17 extends axially through a micrometer thimble 57 telescoped onto the upper end of the boring bar section 35 with a working fit and which thimble has a knurled exterior 58 by which it may be held when turning the same. Formed with the top of the thimble 57 is a depending tubular stem 59 through which the operating rod 55 loosely extends. This stem 59 extends axially into the boring bar section 35 and is connected thereto by screw-threads 60. Normally the thimble 57 is rigidly secured to the operating rod 55 by a wedge pin 61 and a cooperating thumb-screw 62 for common rotation with said rod which, in turn, is normally held by the screw-threads 46 for common rotation with the boring bar 17. Said wedge pin 61 is loosely mounted in an oblique bore 63 in the top of the thimble 57 with its lower end impinging against the operating rod 55 and the thumb-screw 62 extends into said bore, has screw-threaded engagement with the thimble 57 and impinges against the top of the wedge pin 61. Obviously by loosening the screw 62 the thimble 57 may be rotated about the axis of the boring bar 17 to screw its stem 59 in either direction in the boring bar section 35 and thus axially adjust said thimble on the boring bar 17. The operating rod 55 above the thimble 57 is provided with a cross-pin 64 for holding a wrench, not shown, when applied to said rod for turning the same to project or retract the cutter blades 37.

For projecting the cutter blades 37 a predetermined distance for each complete rotation of the pilot 43 and the thimble 57, it is necessary for the screw-threads 46, which connect the pilot 43 to the cutter head 18, and the screw-threads 60, which connect the thimble 57 to the boring bar section 35, to have the same and a predetermined pitch and for the face of the conical member 44 to have a predetermined angle to the axis of said member.

In the present commercial form of the boring machine, in which this invention is embodied, the number of threads 46—60 are each twenty-two per inch and the face of the conical member 44 is 29° from the axis of said member. This ratio of the number of threads 46—60 per inch and the angle of the conical member 44 will advance each cutter blade 37 twenty-five one-thousandths of an inch or a total distance for two diametrically opposite cutter blades 37 fifty one-thousandths of an inch.

A micrometer is provided for setting the thimble 57 which forms a part of said micrometer. The skirt of the thimble 57 at its bottom is inwardly and downwardly beveled to a relatively sharp edge and affords the body 65 of a vernier 66 which circumferentially divides said body into fifty equal spaces, each space or graduation representing one-thousandths of an inch. Said micrometer further includes a vertical scale 67 on the boring bar section 35, which also forms a part of said micrometer, and has equal spaced reading from the top down and each space represents fifty one-thousandths of an inch or one complete turn of the micrometer thimble 57 about its axis and also one complete turn of the pilot 43 when said thimble is secured to the operating rod 55 for rotation therewith. The lower or sharp edge of the thimble 57 cooperates with the scale 67 as a reading line. This scale 67 further includes a vertical reading line 68 for the vernier 66. The scale 67, reading from the top down, has every other space designated as follows: 6—7—8—9—10—1—2—3—4—5—6 and each numeral represents a certain number of thousandths to wit: 6 six-one-hundred one-thousandths of an inch, 7-seven one-hundred one-thousandths of an inch, etc. 10 will be an even number of known inches.

It may be assumed that the diameter of the smallest cut that can be made by the commercial form of the cutter head 18 is two and five-eighths inches. Taking this dimension as an arbitrary working point the third graduation on the scale 67, designated by the numeral 7, indicates the diameter of the cut that the cutter blades 37 will make when the micrometer thimble 57 is adjusted with its lower or reading edge on this graduation and with the zero point of the vernier 66 on the reading line 68 is two inches and seven-hundred one-thousandths of an inch. If the diameter of the cut to be made is say, two inches and seven-hundred and ten one-thousandths of an inch the operating rod 55 must be turned in the boring bar section 35 until the thimble 57 is positioned with the graduation 10 on the vernier in registration with the reading line 68. This last noted adjustment of the micrometer thimble 57 by the operating rod 55 to rotate the pilot 43 in a direction to advance its conical member 44 between the cutter blades 37 and project each thereof five one-thousandths of an inch or, in other words, increase the diameter at which said cutter blades 37 will cut ten one-thousandths of an inch.

As illustrated in Fig. 1, the micrometer thimble 57 is positioned with its lower edge on reading line marked 1 of the scale 67 and the zero point of the vernier 66 is on the reading line 67 indicating that the cutter blades 37 are set to cut a one-hundredth thousandths of an inch plus a known number of inches in this case three inches the total of which is 3.100 inches.

If the thimble 57 is rotated so that its lower edge has passed the reading line between reading line 1 and the reading line 2 and the point midway between point 40 and point zero on vernier 66 stand at reading line 68, the cutter blades 37 will be set to cut a known number of inches plus one-hundred fifty thousandths plus forty-five thousandths the total of which is 3.195 inches.

From the above description it is evident that each time the operating rod 55 is turned to advance the cutter blades 37 the micrometer thimble 57 is turned thereby about the axis of the boring bar 17 which moves the same axially thereon thus changing the reading of the micrometer so that it will indicate at all times the exact diameter at which the cutter blades 37 are set to cut.

What I claim is:

1. A cutter head having an axial recess, cutter blades mounted in the head for radial movement and extending into its recess, a pilot having screw-threaded engagement with the head for compound rotary and axial movements and provided with a conical member extending between the cutter blades for action on their inner ends to project the same by an axial movement of the pilot in one direction, a sleeve-like member in the recess and in which the conical member is turnably mounted, said sleeve-like member being connected to the pilot for axial movement therewith and having notches through which the cutter blades extend, said sleeve-like member being held against rotation in the head by the cutter blades, and cam connections between the cutter blades and sleeve-like member for retracting the cutter blades during axial movement of the pilot in a reverse direction.

2. The structure defined in claim 1 in which the sleeve-like member between said notches is spaced from the head with freedom to yield during projecting movement of the cutter blades.

3. A cutter head having an axial recess, cutter blades mounted in the head for radial movement and extending into its recess, a pilot having screw-threaded engagement with the head for compound rotary and axial movements and provided with a conical member extending between the cutter blades for action on their inner ends to project the same by an axial movement of the pilot in one direction, a sleeve-like member in the recess and in which the conical member is turnably mounted, said sleeve-like member having an inturned flange which rests on a shoulder on the pilot, a washer overlying the flange and interlocked with the pilot for holding the flange on the shoulder, said sleeve-like member having notches through which the cutter blades extend, said sleeve-like member being held against rotation in the head by the cutter blades, and cam connections between the cutter blades and sleeve-like member for retracting the cutter blades during axial movement of the pilot in a reverse direction.

4. The structure defined in claim 1 in which the cam connections include cam lugs on the sleeve-like member that work in cam grooves in the cutter blades.

5. The structure defined in claim 1 in which the cam connections include pairs of cam lugs on the sleeve-like member that work in pairs of cam grooves in the cutter blades, said cam lugs being laterally spaced with respect to the axis of the pilot and said cam grooves being laterally spaced longitudinally of the cutter blades.

THOR THORSEN.